United States Patent
Boehm et al.

(10) Patent No.: US 9,665,710 B2
(45) Date of Patent: *May 30, 2017

(54) MITIGATING ROP ATTACKS

(71) Applicant: International Business Machines Corporation, Armonk, NY (US)

(72) Inventors: Omer Y. Boehm, Haifa (IL); Eitan D. Farchi, Pardes Hana (IL); Oded Margalit, Ramat Gan (IL); Yousef Shajrawi, Haifa (IL); Michael Vinov, Nofit (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/264,672

(22) Filed: Sep. 14, 2016

(65) Prior Publication Data

US 2017/0091447 A1     Mar. 30, 2017

Related U.S. Application Data

(63) Continuation of application No. 15/263,782, filed on Sep. 13, 2016, which is a continuation of application
(Continued)

(51) Int. Cl.
*G06F 11/00*     (2006.01)
*G06F 21/54*     (2013.01)
*G06F 12/06*     (2006.01)

(52) U.S. Cl.
CPC .......... *G06F 21/54* (2013.01); *G06F 12/0646* (2013.01); *G06F 2212/1052* (2013.01)

(58) Field of Classification Search
CPC ...... G06F 21/566; G06F 3/0673; G06F 3/064; G06F 3/0623; G06N 99/005
(Continued)

(56) References Cited

U.S. PATENT DOCUMENTS 9,058,492 B1    6/2015   Satish
9,250,937 B1    2/2016   Franz et al.
(Continued)

OTHER PUBLICATIONS

IBM, List of IBM Patents or Patent Applications Treated as Related, Appendix P, dated Sep. 15, 2016, 2 pages.
(Continued)

*Primary Examiner* — Mohammad W Reza
(74) *Attorney, Agent, or Firm* — David Zwick

(57) ABSTRACT

Mitigating return-oriented programming attacks. Program code and associated components are received and loaded into memory. From the program code and associated components, a predetermined number of sequences of machine language instructions that terminate in a return instruction are selected. The sequences of machine language instructions include: machine language instruction sequences that are equivalent to a conditional statement "if-then-else return," sequences of machine language instructions corresponding to known malicious code sequences, and sequences of machine language instructions corresponding to machine language instructions in known toolkits for assembling malicious code sequences. For each selected machine language instruction sequence, memory blocks containing the selected machine language instruction sequence are rearranged using address space layout randomization (ASLR); then, upon expiration of an expected time interval required to locate the selected machine language instruction sequence by inspecting the rearranged memory blocks, the rearranging is repeated, thereby mitigating ROP attacks.

1 Claim, 5 Drawing Sheets

Related U.S. Application Data

No. 15/132,739, filed on Apr. 19, 2016, which is a continuation of application No. 14/870,050, filed on Sep. 30, 2015.

(58) Field of Classification Search
USPC .......................................................... 726/23
See application file for complete search history.

(56) References Cited

U.S. PATENT DOCUMENTS

| | | | |
|---|---|---|---|
| 2012/0167120 A1 | 6/2012 | Hentunen | |
| 2013/0117843 A1* | 5/2013 | Komaromy | G06F 21/52 726/22 |
| 2013/0185792 A1 | 7/2013 | Balakrishnan et al. | |
| 2015/0047049 A1 | 2/2015 | Panchenko et al. | |
| 2015/0215335 A1 | 7/2015 | Giuliani et al. | |
| 2016/0092674 A1* | 3/2016 | Hughes | G06F 21/52 726/22 |
| 2016/0092675 A1* | 3/2016 | Vidrine | G06F 21/52 726/22 |

OTHER PUBLICATIONS

Pending U.S. Appl. No. 15/263,782, filed Sep. 13, 2016, Entitled "Mitigating ROP Attacks".
Pending U.S. Appl. No. 15/132,739, filed Sep. 19, 2016, Entitled "Mitigating ROP Attacks".
Pending U.S. Appl. No. 14/870,050, filed Sep. 30, 2015, Entitled "Mitigating ROP Attacks".
Wikipedia, "Return-oriented programming," https://en.wikipedia.org/wiki/Return-oriented_programming, Printed on Jul. 6, 2015, pp. 1-3.
Wikipedia, "Address space layout randomization," https://en.wikipedia.org/wiki/Address_space_layout_randomization, Printed on Jul. 6, 2015, pp. 1-5.
Microsoft, "Mircosoft Security Intelligence Report," Managing Risk, http://www.microsoft.com/security/sir/strategy/default.aspx#!section_3_3, Printed on Jul. 6, 2015, p. 1.
Wikipedia, "Data Execution Prevention," https://en.wikipedia.org/wiki/Data_Execution_Prevention, Printed on Jul. 6, 2015, pp. 1-3.
Microsoft, "What is Data Execution Prevention," http://windows.microsoft.com/en-us/windows-vista/what-is-data-execution-prevention, Printed on Jul. 6, 2015, pp. 1-1.
Microsoft, "A detailed description of the Data Execution Prevention (DEP) feature in Windows XP Service Pack 2, Windows XP Tablet PC Edition 2005, and Windows Server 2003," https://support.microsoft.com/en-us/kb/875352, Printed on Jul. 6, 2015, pp. 1-5.
Roemer et al., "Return-Orientated Programming: Systems, Languages, and Applications," ACM Transactions on Information and System Security (TISSEC)—Special Issue on Computer and Communications Security, vol. 15, Issue 1, Mar. 2012, Article No. 2, pp. 1-42.
Pappas et al., "Practical Software Diversification Using In-Place Code Randomization," Chapter 9; Moving Target Defense II: Advanced in Information Security, vol. 100, 2013, Springer, for Research and Development, p. 169-196.
Pappas, "Defending against Return-Oriented Programming," Columbia University, 2015, Submitted in partial fulfillment of the requirements for the degree of Doctor of Philosophy in the Graduate School of Arts and Sciences, pp. 1-127.
Wartell et al., "Binary Stirring: Self-randomization Instruction Addresses of Legacy x86 Binary Code," CCS' 2012, Oct. 16-18, 2012, Raleigh, North Carolina, pp. 1-12.
Pappas et al., "Smashing the Gadgets: Hindering Return-Oriented Programming Using In-Place Code Randomization," Proceeding SP '12, Proceedings of the 2012 IEEE Symposium on Security and Privacy, pp. 1-15.
Anckaert et al., "Run-Time Randomization to Mitigate Tampering," IWSEC 2007, LNCS 4752, 2007, Springer-Verlag Berlin Heidelberg 2007, pp. 153-168.
Pappas et al., "Transparent ROP Exploit Mitigation using Indirect Branch Tracing," Proceeding SEC '13, Proceedings of the 22nd USENIX conference on Security, 2013, pp. 447-462.
Kil et al., "Address Space Layout Permutation (ASLP): Towards Fine-Grained Randomization of Commodity Software," Proceeding ACSAC '06, Proceedings of the 22nd Annual Computer Security Applications Conference, 2006, pp. 339-348.
Bhatkar et al., "Efficient Techniques for Comprehensive Protection from Memory Error Exploits," Proceeding SSYM '05, Proceedings of the 14th conference on USENIX Security Symposium 2005, vol. 14, pp. 225-270.
Forrest et al., "Building Diverse Computer Systems," In Proceedings of the 6th Workshop on Hot Topics in Operating Systems, IEEE Computer Society Press, Los Alamitos, CA, 1997, pp. 1-6.
Skowyra et al., "Systematic Analysis of Defenses against Return-Oriented Programming," RAID 2013, LNCS 8145, Springer-Verlag Berlin Heidelberg, 2013, pp. 82-102.
Pappas et al., "Dynamic Reconstruction of Relocation Information for Stripped Binaries," Research in Attacks, Intrusions and Defenses; Lecture Notes in Computer Science, vol. 8688, 2014, pp. 68-87.
Volckaert et al., "Cloning your Gadgets: Complete ROP Attack Immunity with Mulit-Variant Execution," Dependable and Secure Computing, IEEE Transactions, vol. PP, Issue 09, Mar. 9, 2015, pp. 1-14.

* cited by examiner

MITIGATING ROP ATTACKS

BACKGROUND

The present invention relates generally to the field of information security, and more particularly to prevention of return-oriented programming (ROP) attacks.

ROP is a powerful technique by which an attacker can induce unwanted behavior in a computer program whose control the attacker has diverted, without injecting any malicious code. As such, ROP may be used to overcome various strategies designed to prevent the execution of malicious code in the data area, such as data execution prevention (DEP), a security feature in modern operating systems that marks certain areas of memory as non-executable and others as executable. DEP allows only data in an area marked as executable to be run by programs, services, device drivers, etc.

When using ROP, an attacker uses control over the execution stack prior to a function return to direct code execution to some other location in the program. It is relatively straightforward to achieve almost arbitrary code execution by compiling a payload, or malicious code sequence, consisting of a combination of carefully chosen machine language instruction sequences, called gadgets. Gadgets are generally short, typically two to five instructions long, end in a return instruction, and are located in a subroutine within program code or shared library code, for example, libc, the C standard library, or in Windows dlls. A gadget may, for example, consist of a single machine language instruction followed by a return. Various automated tools have been developed to aid in locating gadgets to use in an ROP exploitation.

Address space layout randomization (ASLR) is a computer security technique involved in protection from buffer overflow attacks. In order to prevent an attacker from reliably jumping to, for example, a particular exploited function in memory, ASLR randomly rearranges the address space positions of key data areas of a process, including the base of the executable and the positions of the stack, heap, and libraries. ASLR is designed to prevent attacks that make assumptions about the load address of code, but ROP attacks may circumvent ASLR by scanning memory and either finding a known anchor in the code area and calculating offsets from it, or searching for gadgets in the scanned memory.

Another approach to ROP mitigation is instruction location randomization (ILR). ILR focuses on preventing attacks which rely on code being located predictably by randomizing the location of every instruction in a program. Each instruction has an explicit successor, but this information is hidden from an attacker, thus preventing an attacker from easily locating the gadgets required to create a particular malicious code sequence. However, ILR may reduce the stability of running processes and/or severely degrade the end-user experience.

SUMMARY

Embodiments of the present invention disclose a computer-implemented method, computer program product, and system for mitigating return-oriented programming (ROP) attacks. Program code and associated components needed by the program code for execution are received and loaded into memory. From the program code and associated components, a predetermined number of sequences of machine language instructions that terminate in a return instruction are selected. The sequences of machine language instructions include: machine language instruction sequences that are equivalent to a conditional statement "if-then-else return," sequences of machine language instructions corresponding to known malicious code sequences, and sequences of machine language instructions corresponding to machine language instructions in known toolkits for assembling malicious code sequences. For each selected machine language instruction sequence, memory blocks containing the selected machine language instruction sequence are rearranged using address space layout randomization (ASLR); then, upon expiration of an expected time interval required to locate the selected machine language instruction sequence by inspecting the rearranged memory blocks, the rearranging is repeated, thereby mitigating ROP attacks.

DETAILED DESCRIPTION

Embodiments of the present invention disclose a computer-implemented method, computer program product, and system for mitigating return-oriented programming (ROP) attacks. A set of gadgets is identified in program code and shared libraries. The gadgets are cloned and the clones are marked non-executable. The gadgets and the clones are hidden by distributing them randomly in memory. If an attacker searching for gadgets to combine in an ROP exploit executes a non-executable gadget, an alert may be raised and protective action may be taken.

Figure 1:
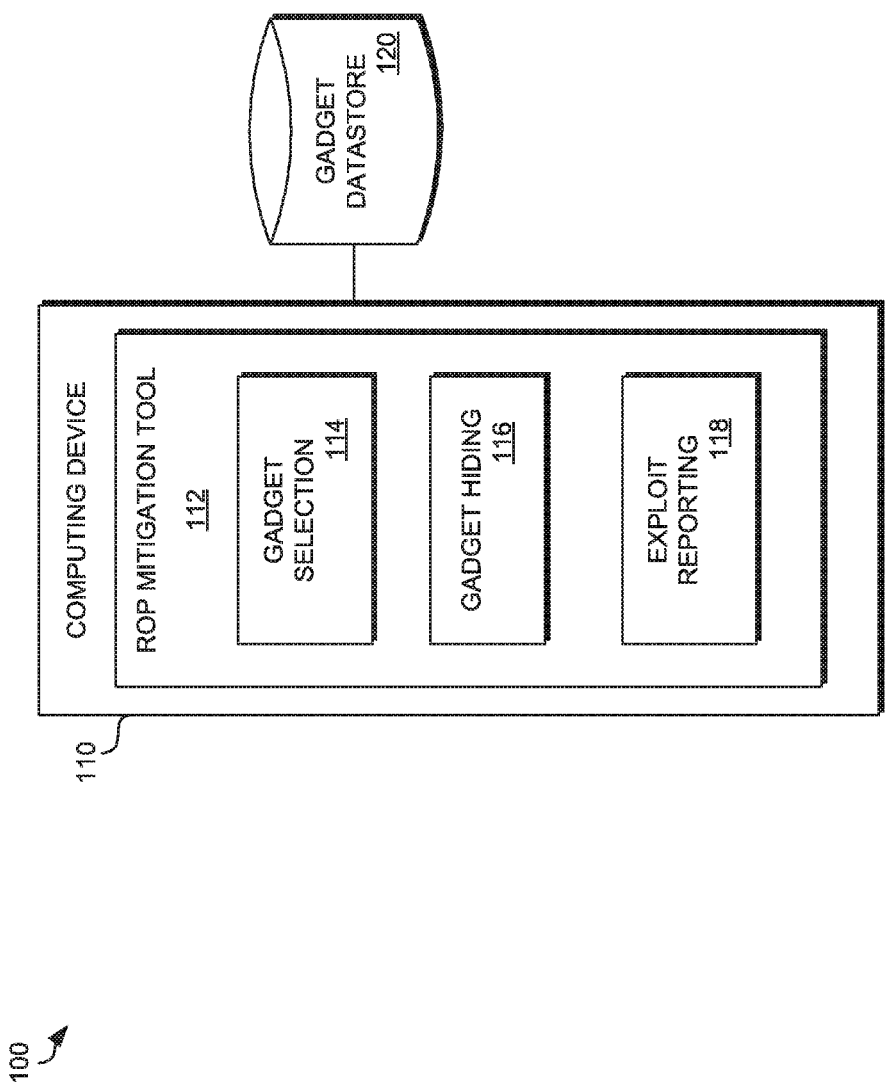
FIG. 1 depicts a functional block diagram of a return-oriented programming (ROP) mitigation system, in accordance with an embodiment of the present invention.

FIG. 1 is a functional block diagram of an ROP mitigation system 100, in accordance with an embodiment of the present invention. ROP mitigation system 100 includes computing device 110. Computing device 110 represents the computing environment or platform that hosts ROP mitigation tool 112. In various embodiments, computing device 110 may be a laptop computer, netbook computer, personal computer (PC), a desktop computer, or any programmable electronic device capable of hosting ROP mitigation tool 112, in accordance with embodiments of the invention. Computing device 110 may include internal and external hardware components, as depicted and described in further detail below with reference to FIG. 3.

In an exemplary embodiment of the invention, computing device 110 includes ROP mitigation tool 112 and gadget datastore 120. ROP mitigation tool 112 may further include gadget selection module 114, gadget hiding module 116, and exploit reporting module 118.

Figure 3:
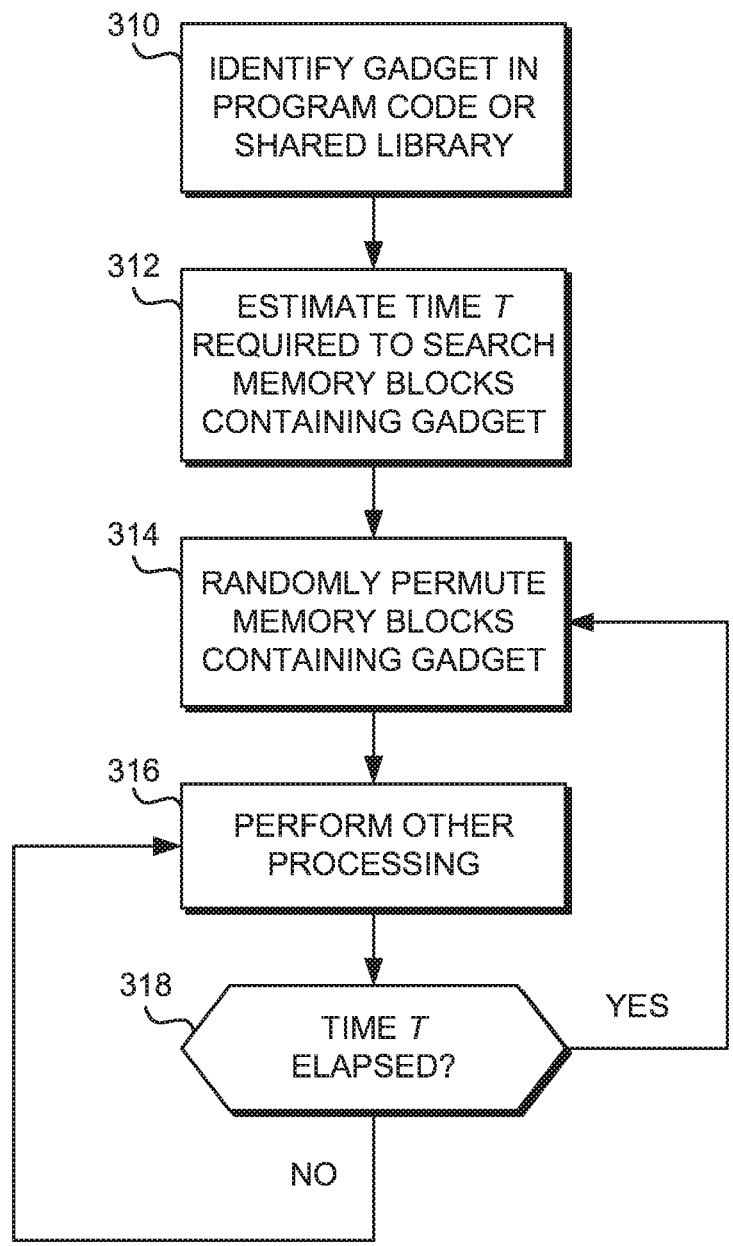
FIG. 3 is another flowchart depicting operational steps of an ROP mitigation tool, in accordance with an embodiment of the present invention.

Gadget datastore 120 represents a store of gadgets that may be cloned and stored in memory prior to a program execution, in accordance with an embodiment of the present invention. Gadget datastore 120 may reside, for example, on computer readable storage media 908 (FIG. 3).

ROP mitigation tool 112, in an exemplary embodiment of the invention, operates generally to clone a predetermined, configurable number of code gadgets prior to a process run start. ROP mitigation tool 112 may employ data execution prevention (DEP) to mark all pages containing the duplicated copies as non-executable, such that there are multiple non-executable clones and only one executable copy. When an attacker searches the memory address space for gadgets to use in an ROP attack, the attacker encounters multiple copies of each gadget sought. The use of any of these gadgets, except the ones embedded in the executable copy, will, due to DEP, raise an alert or cause the process to crash, allowing the attack to be reported and preventing the successful conclusion of the attack. In various embodiments, ROP mitigation tool 112 may be part of the system loader or may be some other privileged OS tool. In other embodiments, ROP mitigation tool 112 may be included as part of an anti-malware package.

Gadget selection module 114, in an embodiment of the invention, may identify gadgets to clone, for example, by searching program code and/or shared libraries in memory for machine code equivalent to a conditional statement "if-then-else . . . return" and extracting the code in the else clause, including the return instruction. Alternatively, gadget selection module may use knowledge of known examples of ROP attacks, or of known toolkits for assembling malicious code for an ROP attack, to select the gadgets to clone.

In various embodiments of the present invention, gadget selection module 114 may assemble a set of gadgets to clone from program code and shared libraries subsequent to these components being loaded into memory. Alternatively, or additionally, gadget selection module 114 may assemble a set of gadgets to clone prior to loading a program. Gadget selection module 114 may store the gadgets to be cloned, or references to the gadgets, in gadget datastore 120.

Gadget hiding module 116, in response to a request for preventative action against a possible ROP attack, may make a predefined number of copies of gadgets in gadget datastore 120, in an exemplary embodiment of the invention. Gadget hiding module 116 may use DEP to mark blocks of memory, such as memory pages, procedures, or shared libraries, containing cloned gadgets, as non-executable. Gadget hiding module 116 may employ for this purpose DEP, for example, hardware-enforced DEP, if supported by the operating system on computing device 110. Alternatively, gadget hiding module 116 may employ software-enforced DEP, which emulates hardware-enforced DEP. Gadget hiding module 116 may further use a technique such as address space layout randomization (ASLR) to rearrange memory blocks containing a gadget and memory blocks containing non-executable clones of the gadget.

Exploit reporting module 118, in an exemplary embodiment of the invention, may intercept alerts or exceptions raised as a result of an attacker attempting to execute a non-executable cloned gadget, and report a potential ROP attack to the OS, which may initiate protective or ameliorative measures. For example, the OS may terminate one or more active processes and report a possible exploit.

In an alternative embodiment of the invention, a gadget is identified by gadget selection module 114 in loaded program code or shared library code. Gadget hiding module 116 may "hide" the gadget by using ASLR to randomly permute a number of memory blocks containing the gadget, based on the size of the code in which the gadget is located.

In various embodiments of the present invention, ROP mitigation via gadget cloning and/or hiding may be viewed as a two-person, zero-sum game, the solution of which is well known in game theory. The first player, or defender, tries to make it difficult to find real, or executable, gadgets by selecting an appropriate number of gadgets to clone, and deciding where to hide them, for example, in a system library. The second player, or attacker, searches for gadgets and checks if they are real or not. The cost to the defender includes the number of gadgets the defender can clone without severely impacting memory consumption. The cost to the attacker is associated with searching for a predetermined number of real gadgets. The solution of this two-person zero-sum game, known as a Nash equilibrium, may lead to a cloning/hiding approach that yields an optimal defense against an ROP attack.

For example, suppose that, in an embodiment of the invention, an attacker searches for a specific gadget, which gadget hiding module 116, the defender, has hidden among a number of randomly permuted blocks of memory, as described above. Applying an optimal strategy, the attacker chooses a random order, or permutation, to search the memory blocks. In terms of game theory, the cost of the search, which the attacker pays to the defender, is the number of blocks that must be checked before finding the gadget. For example, suppose there are four memory blocks, $b_1$, $b_2$, $b_3$ $b_4$, one of which, $b_3$, contains the gadget. If the attacker randomly chooses to search the blocks in the order 4, 2, 3, 1, then the cost to the attacker in searching for this particular gadget is 3. In general, suppose that N is a collection of n memory blocks, one of which contains a gadget sought by an attacker. An optimal strategy for the defender is to randomly select one of these to contain the gadget. As mentioned, an optimal strategy for the attacker is to randomly choose, with probability $1/(n!)$, one of the n! possible orders to inspect the n blocks. Since there are $(n-1)!$ orders in which a gadget is hidden in a particular block of the n blocks, the expected, or average, cost to the attacker in searching for the hidden gadget is $$\frac{1}{n!}(n-1)!(1+2+\ldots+n) = \frac{n+1}{2}$$

That is, the attacker will have to search, on average, $(n+1)/2$ memory blocks in order to find the gadget. This represents a Nash equilibrium because there is no gain if either of the players adopts a different strategy. Based on this result, it would be advantageous for a defender re-hide the real gadget before an attacker has an opportunity to search $(n+1)/2$ blocks. The determination of when to re-hide a gadget may be based on monitoring processes' reading of memory blocks, or on an estimate of the time it would take for a process to read $(n+1)/2$ blocks.

An equivalent result holds if, instead of hiding a gadget among n memory blocks, a defender hides a gadget among n copies of a gadget, of which only one is executable and all others are non-executable clones.

It may be shown, using game theoretical reasoning as above, that hiding a real gadget and at least one non-executable clone of the gadget among n blocks of memory is a more effective strategy than just hiding a single gadget among n blocks of memory. That is, the expected cost to an attacker is greater if the attacker may first encounter either the real gadget or a non-executable clone in inspecting memory blocks in a random order.

In another embodiment, gadget hiding module 116 chooses from gadget datastore 120 a number k of individual, executable gadgets, which may be assembled in a particular order to generate a payload, and stores them in memory in random order. Only if an attacker accesses the gadgets in memory in the correct order does the attack succeed. Game theory may be applied here as well. In this case, the n blocks described above may represent the k! different orders, in which an attacker might inspect the k gadgets. Choosing the correct order is equivalent to choosing the same element of N as the defender, as above.

Exploit reporting module 118, in an exemplary embodiment of the invention, may intercept alerts or exceptions raised as a result of an attacker attempting to execute a non-executable cloned gadget, and report a potential ROP attack to the operating system for possible further preventative or ameliorative measures. Alternatively, exploit reporting module 118 may report that a set of gadgets that may be combined to create a payload, and which have been permuted in memory, have been accessed in the wrong order.

Figure 2:
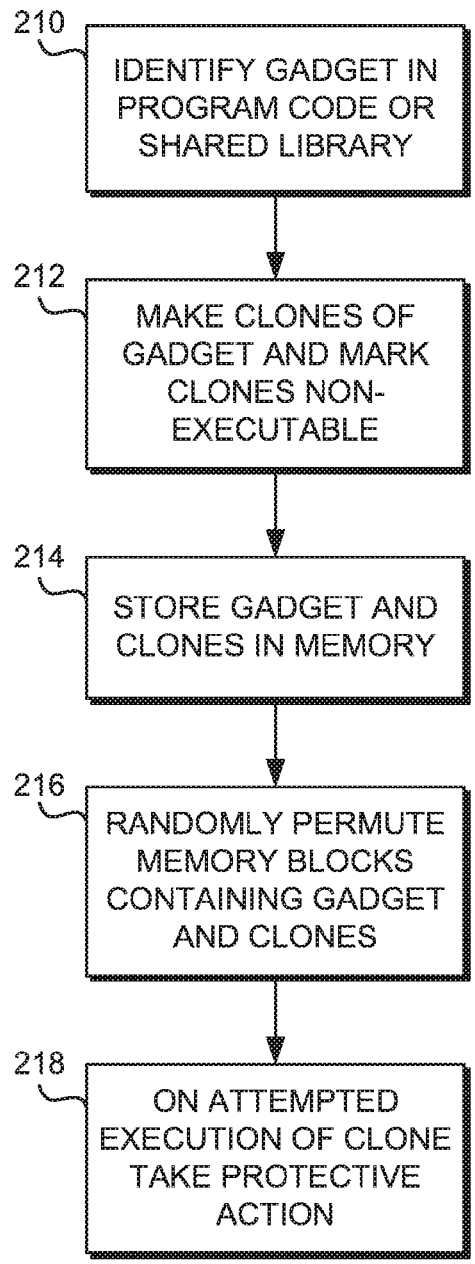
FIG. 2 is a flowchart depicting operational steps of an ROP mitigation tool, in accordance with an embodiment of the present invention.

FIG. 2 is a flowchart depicting operational steps performed by computing device 110 in executing ROP mitigation tool 112, in accordance with an exemplary embodiment of the invention. Gadget selection module 114 identifies gadgets in loaded program code and/or shared libraries and stores them in gadget datastore 120 (step 210). For each gadget, gadget hiding module 116 makes a predefined number of non-executable clones (step 212), stores the gadget and the clones in memory (step 214), and randomly permutes the memory blocks containing the gadget and the clones (step 216). In response to a process attempting to execute a non-executable clone, exploit reporting module 118 reports a possible ROP exploit to the operating system for protective action (step 218).

FIG. 3 is a flowchart depicting operational steps performed by computing device 110 in executing ROP mitigation tool 112, in an alternative embodiment of the invention. Gadget selection module 114 identifies gadgets in loaded program code and/or shared libraries and stores them in gadget datastore 120 (step 310). For each gadget, gadget hiding module 116 estimates the expected time T it would take for an attacker to find the gadget by inspecting randomly permuted memory blocks containing the gadget (step 312). Gadget hiding module 116 randomly permutes memory blocks containing the gadget (step 314). So long as time T has not expired (decision step 318, NO branch), program execution continues (step 316). At expiration of time T (decision step 318, YES branch), the memory blocks containing the gadget are again randomly permuted (step 314).

Figure 4:
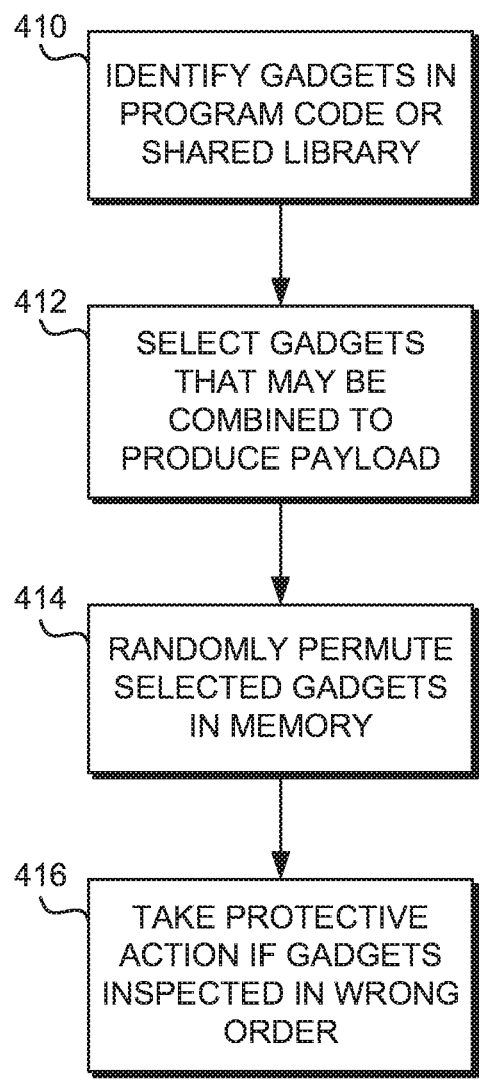
FIG. 4 is another flowchart depicting operational steps of an ROP mitigation tool, in accordance with an embodiment of the present invention.

FIG. 4 is a flowchart depicting operational steps performed by computing device 110 in executing ROP mitigation tool 112, in another embodiment of the invention. Gadget selection module 114 identifies gadgets in loaded program code and/or shared libraries and stores them in gadget datastore 120 (step 410). Gadget selection module 114 selects a set of gadgets from gadget datastore 120 that may be combined in a certain order to create a payload (step 412). Gadget hiding module 116 randomly permutes the selected gadgets in memory (step 414). In response to the gadgets being accessed in the wrong order, exploit reporting module 118 reports a possible ROP exploit to the operating system for protective action (step 416).

Figure 5:
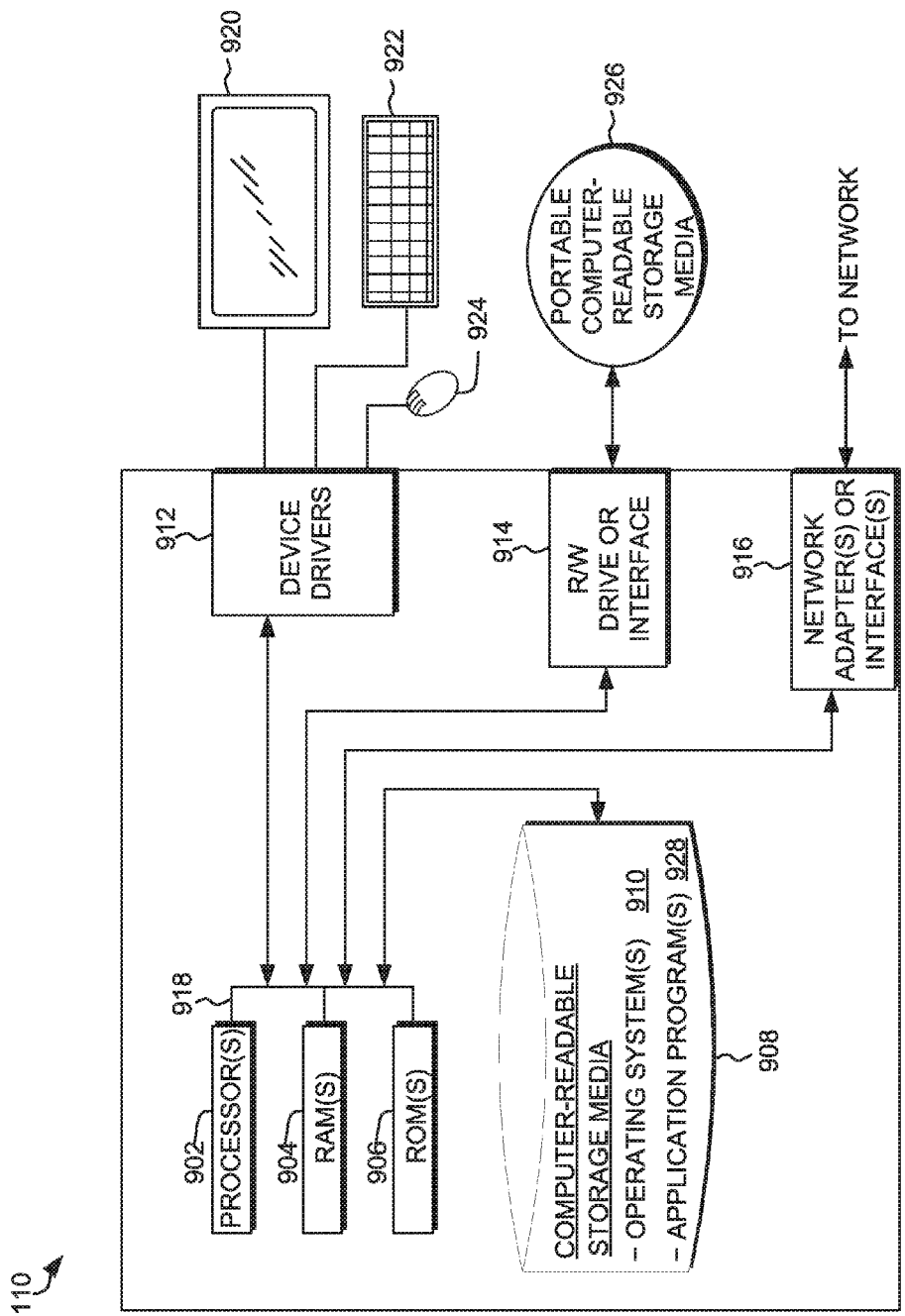
FIG. 5 is a functional block diagram illustrating a data processing environment, in accordance with an embodiment of the present invention.

FIG. 5 depicts a block diagram of components of a computing device 110, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, ROP mitigation tool 112, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 914 to read from and write to one or more portable computer readable storage media 926. Application programs 928 on computing device 110 may be stored on one or more of the portable computer readable storage media 926, read via the respective R/W drive or interface 914 and loaded into the respective computer readable storage media 908.

Computing device 110 may also include a network adapter or interface 916, such as a TCP/IP adapter card or wireless communication adapter (such as a 4G wireless communication adapter using OFDMA technology). Application programs 928 on computing device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer system for mitigating return-oriented programming (ROP) attacks, the computer system comprising:
one or more computer processors, one or more non-transitory computer-readable storage media, and program instructions stored on one or more of the non-transitory computer-readable storage media for execution by at least one of the one or more processors, the program instructions comprising:
program instructions to receive program code for execution and associated components needed by the program code for execution;
program instructions to load the program code and associated components into memory;
program instructions to select a predetermined number of sequences of machine language instructions from the loaded program code and the associated components, wherein each sequence terminates in a return instruction, and wherein the predetermined number of sequences includes:
machine language instruction sequences that are equivalent to a conditional statement "if-then-else return";
sequences of machine language instructions corresponding to known malicious code sequences; and
sequences of machine language instructions corresponding to machine language instructions in known toolkits for assembling malicious code sequences; and
for each selected machine language instruction sequence, program instructions to:
rearrange memory blocks containing the selected machine language instruction sequence, using address space layout randomization (ASLR); then
wait an expected time interval required to locate the selected machine language instruction sequence by inspecting the rearranged memory blocks; and
repeat the rearranging at the expiration of the expected time interval;
whereby ROP attacks are mitigated.

* * * * *